United States Patent [19]

Perkinson et al.

[11] Patent Number: 4,898,324

[45] Date of Patent: Feb. 6, 1990

[54] METERING VALVE TEMPERATURE COMPENSATION

[75] Inventors: Robert H. Perkinson, Somers, Conn.; Charles F. Stearns, East Longmeadow; Rene F. Belanger, Holyoke, both of Mass.

[73] Assignee: United Technologies Corporation, Hartford, Conn.

[21] Appl. No.: 358,506

[22] Filed: May 30, 1989

Related U.S. Application Data

[63] Continuation of Ser. No. 111,398, Oct. 22, 1987, now abandoned.

[51] Int. Cl.⁴ ............................................. G05D 27/00
[52] U.S. Cl. .................................... 236/92 R; 60/261; 236/93 R; 236/102
[58] Field of Search ................... 236/93 R, 93 A, 102, 236/92 R; 137/468; 60/261

[56] References Cited

U.S. PATENT DOCUMENTS

| | | | |
|---|---|---|---|
| 1,694,492 | 12/1928 | Tabler | 236/102 X |
| 1,726,068 | 8/1929 | Hoescher | 236/102 X |
| 2,786,713 | 3/1957 | Donaldson | 236/102 X |
| 2,792,180 | 5/1957 | Flagg | 236/102 X |
| 2,822,666 | 2/1958 | Best | 60/39.28 |
| 3,294,148 | 12/1966 | Alvarado | 236/93 R X |
| 3,420,440 | 1/1969 | Viner | 236/93 A |
| 3,500,634 | 3/1970 | Waseleski, Jr. et al. | 251/11 X |
| 3,953,967 | 5/1976 | Smith | 60/39.28 |
| 3,964,253 | 6/1976 | Paduch et al. | 60/39.14 |
| 4,027,472 | 6/1977 | Stearns | 60/39.28 |
| 4,422,287 | 12/1983 | Stearns et al. | 60/39.281 |
| 4,440,191 | 4/1984 | Hansen | 137/468 |
| 4,440,192 | 4/1984 | Donnelly et al. | 137/501 |
| 4,449,548 | 5/1984 | Tutherly | 137/468 |
| 4,805,658 | 2/1989 | Perkinson et al. | 137/81.1 |
| 4,825,649 | 5/1989 | Donnelly et al. | 60/261 |

Primary Examiner—William E. Tapolcai
Attorney, Agent, or Firm—Lloyd D. Doigan

[57] ABSTRACT

An apparatus for correcting the weight flow of fluid passing through a fuel control is shown. A bimetallic probe is placed within a metering spool to sense temperature variation of the fuel passing therethrough. A feedback mechanism senses changes in the probe and nulls the spool. The spool cooperates with specially shaped windows in a sleeve so that a percentage change in temperature allows a corresponding percentage change in fuel flow thereby offsetting changes in fuel density (and weight flow) caused by temperature changes. The probe is comprised of a rod and a perforated shell.

8 Claims, 2 Drawing Sheets

METERING VALVE TEMPERATURE COMPENSATION

This application is a continuation of application Ser. No. 111,398, filed Oct. 22, 1987, now abandoned.

DESCRIPTION

1. Technical Field

This invention relates to fuel controls and more particularly to fuel controls which compensate for changes in fuel temperature.

2. Background Art

Fuel controls meter fuel to the combustion chamber of a gas turbine engine. Ideally the weight flow of the metered fuel is constant for any given operating condition where speed and inlet air density are constant. However, the temperature of the fuel that is delivered to the fuel control may vary typically in the range from $-65°$ to $230°$ F. Such a fuel temperature range results in a density change of the fuel of approximately 7% over the range. Because most fuel control metering valves are constant volumetric flow rate devices, if the density change is not compensated for, an error in weight flow results. Prior art devices typically adjust the pressure drop across the fuel control metering valve as a function of temperature to keep the fuel weight flow constant.

Some high speed military aircraft engines have augmentors (afterburners) in which the exhaust from the gas turbine engine is heated to a higher temperature by adding fuel to the turbine exhaust gas to produce higher jet exhaust velocity and consequently higher thrust. Augmentors are generally used for short periods of time, and may remain off for long periods. The augmentor fuel control, and the fuel therein, may become very hot during off periods. However, when the augmentor is actuated, very cold fuel may be delivered to the augmentor fuel control from the fuel tanks. A rapid temperature change provides a rapid density change which causes a rather large fuel weight flow error. Conventional methods for providing compensation for the change are generally slow. Augmentors generally will have been turned off by the time the compensation has had any effect.

DISCLOSURE OF INVENTION

It is an object of the invention to provide quick compensation for changes in the density of fuel passing through a fuel control to accurately control the weight flow of fuel passing therefrom.

It is a further object of the invention to provide such compensation directly without involving the fuel control digital electronic control.

According to the invention, the apparatus for metering a constant weight flow of fluid while compensating for temperature changes of said fluid is provided. A temperature probe, which senses a change in temperature, changes a given percentage in response to the temperature change. A valve for metering a constant weight flow, which has a plurality of windows and a spool for cooperating with the windows, meters a percentage change in flow corresponding to the percentage change of the temperature probe.

According to a feature of the invention, the temperature probe is comprised of a first metallic element and a coaxial second metallic element disposed about the first metallic element, the second element having a plurality of apertures so that a fluid being monitored may be readily sensed by the first and second elements. The temperature probe is situated in the interior of the metering valve thus being exposed to flowing fuel as it enters the fuel control. In this position, it is closely coupled to the actual temperature of the fuel as it metered to the augmentor.

According to a further feature of the invention, the windows of the valve are specially shaped to allow a logarithimic flow therethrough. Such shaping allows a percentage change in weight flow corresponding to a percentage change in the temperature probe.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
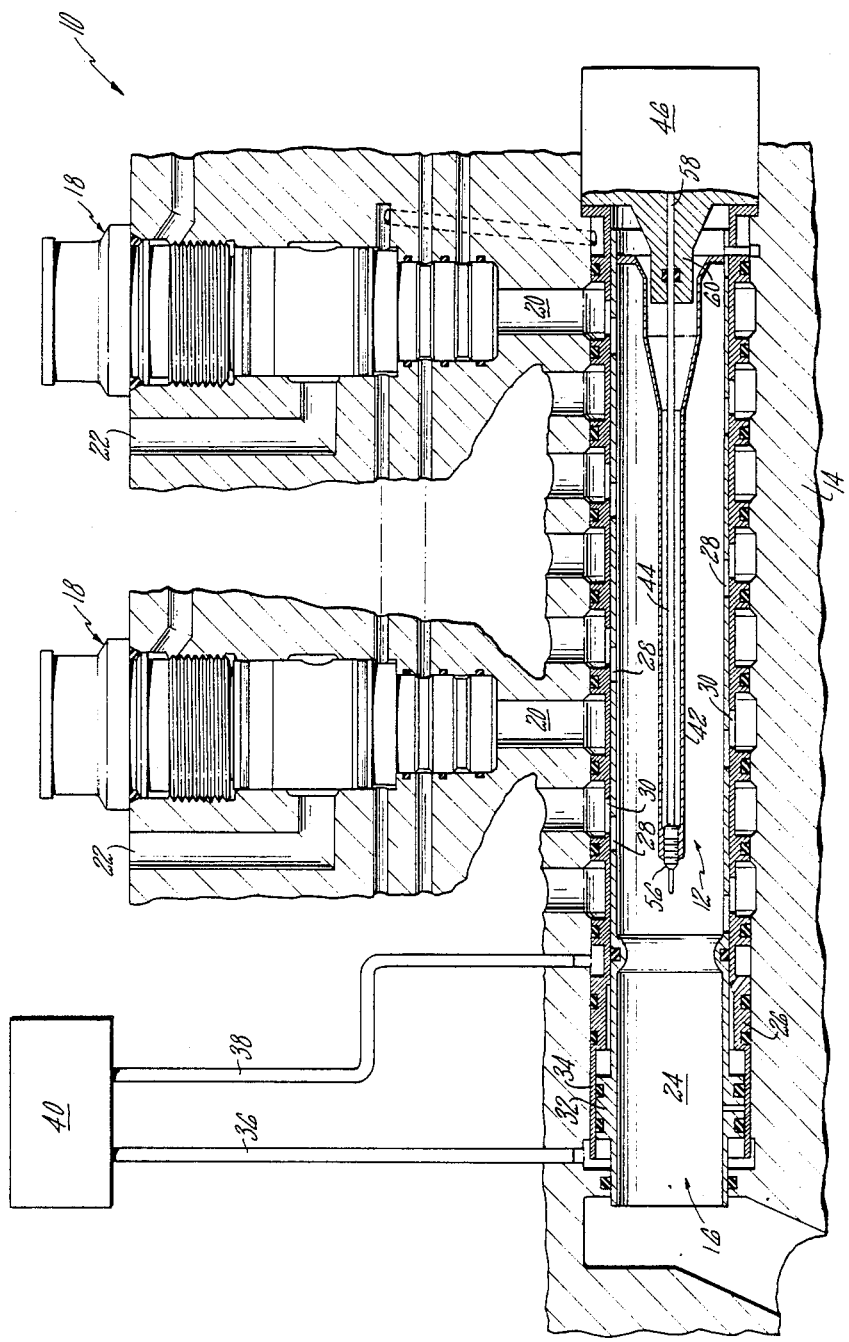
FIG. 1 is a schematic view, partially cut away, of a fuel control incorporating an embodiment of an apparatus for adjusting the metered flow as a function of temperature.

Referring fo FIG. 1 a portion of a fuel control 10 incorporating an embodiment of the temperature compensation probe 12 of the invention is shown. The fuel control is designed generally to control the amount and sequence of fuel provided to the afterburning segments (not shown) of a turbofan or turbojet engine (not shown). The fuel control generally includes a housing 14, a metering valve 16, the temperature probe 12 and a plurality of shut-off and pressure regulating valves 18 (SRV).

Figure 2:
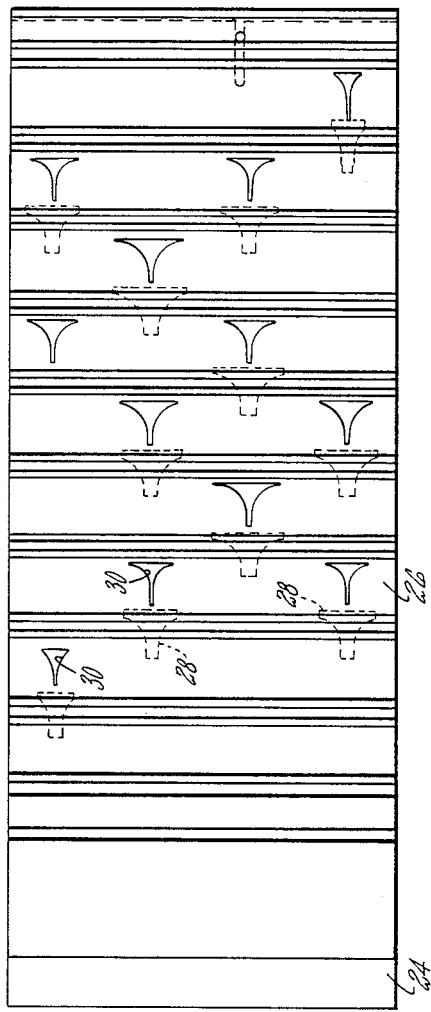
FIG. 2 is a developed view of the metering sleeve spool of FIG. 1.

The metering valve 16 regulates the amount of fuel flowing to the afterburner segments through the shut-off and pressure regulating valves 18 via line 20 and line 22. Each SRV opens the flow to each segment as required and, regulates the pressure drop across the metering valve. As is well known in the art, the pressure regulating valve provides a constant pressure drop across the metering valve. (The SRVs do not comprise a portion of the invention disclosed herein). The metering valve has a roughly cylindrical spool 24 that is close fitted for reciprocal movement within a cylindrical sleeve 26 within the housing 14. The spool has a plurality of apertures 28 (shown as dotted lines in FIG. 2) which mimic the shape of specially shaped windows 30 (as will be discussed infra) in the sleeve. Each window in the sleeve communicates with an SRV 18 via line 20.

A cylindrical flange 32 extends outwardly from a left-hand portion of the spool 24 within an enlarged 34 portion of the sleeve 26. Hydraulic fluid is brought to bear upon the flange via line 36 or line 38. A digital electronic fuel control (DEC not shown) controls an electrohydrolic valve (EHV) 40 which regulates the pressure of a fluid admitted to line 36 or line 38 thereby subjecting the flange 32, and therefore the spool, to pressure unbalances which cause the spool to move laterally. Lateral movement of the spool effects the cross-sectional area openings between the window and the apertures, metering the flow to each afterburner segment thereby.

Figure 3:
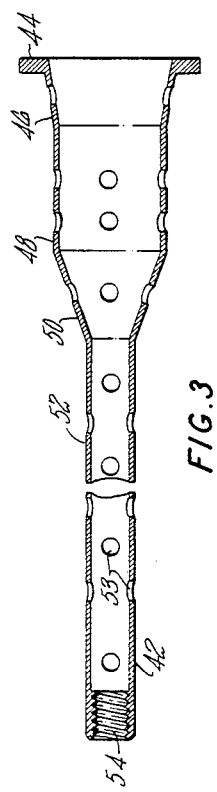
FIG. 3 is a cut away view of the shell of FIG. 1.

The temperature compensation probe 12 is disposed coaxially within the spool 24. The probe is comprised of an exterior shell 42, a rod 44, and a feedback means 6. The shell and the rod are comprised of separate metals (AMS 5630 steel and a nickel alloy, such as INVAR both supplied by General Aerospace of Plainview, New York, respectively) to form a temperature sensitive, bimetallic element. The workings of bimetallic elements are well known in the art. The shell (see FIG. 3) is hollow, thin walled, and perforated and has five coaxial portions. The shell has a large diameter first portion 44 which is attached to the spool 24 by conventional means, a conical second portion 46 which tapers inwardly towards the left, a cylindrical third portion 48 which extends to the left from the second portion, a conical fourth portion 50 which tapers inwardly toward the left from the third portion and a cylindrical fifth portion 52 which extends from the fourth portion to the left. A threaded section 54 is disposed within the lefthand side of the fifth portion. The shell has a plurality of perforations to allow the fluid to bathe the interior of the shell and the rod. As fuel passes from right to left in the spool, the pressure therein tends to drop from right to left as the fuel passes to each segment. The shape of the temperature probe, which basically increases in thickness towards the right, tends to maintain the pressure of the fuel within the length of the spool constant.

The rod 44 has a threaded first end portion 56 for mating with the threaded section 54 of the fifth portion 52 of the shell 42. A second end portion 58 of the rod attaches to the feedback means 46 which may comprise resolver or a linear variable transducer. The rod is mounted for reciprocal motion within a bearing surface 60 of the housing. The feedback device sends a signal to the DEC (not shown).

Figure 4:
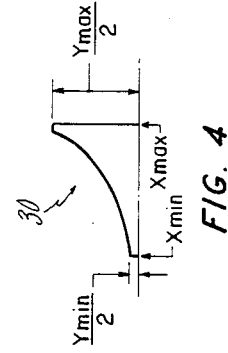
FIG. 4 is an enlarged view of a window of the sleeve of FIG. 2.

The windows 30 (see FIGS. 2 and 4) utilized in the sleeve are specially shaped to allow a logarithimic flow. It is known for instance that:

$$Q = KA(\delta PS)^{.5}$$

where
Q=engine fuel flow
A=metering valve flow window area
$\delta P$=metering valve pressure drop
S=fuel specific gravity
K=orifice flow constant.

It can be seen that a change in fuel flow Q is dependent on a change in specific gravity S:

$$\frac{dQ}{Q} = \frac{dA}{A} + .5 \frac{dS}{S}$$

Since it is desired that Q remain constant with changes in S then:

$$\frac{dA}{A} + .5 \frac{ds}{S} = o \text{ or } \frac{dA}{A} = .5 \frac{ds}{S}$$

It is seen that a 1 percent change in S must create a ½ percent change in A.

Evaluating further, it is known that the shell and rod of the probe have different expansion rates as a function of temperature. The elements are so constructed, as is known in the art, so as to provide a small differential of expansion along an X-axis (dx) such that:

$$dx = kdT \text{ where } k \text{ is a constant}$$

It is also known that the specific gravity of a fuel may be defined as:

$$S = aT + C \quad \text{where } a \text{ is a rate of change of specific gravity with temperature and } C \text{ is a constant.}$$

Similarly, a change in specific gravity is:

$$dS = adT.$$

Upon substituting for dt from above we find that:

$$dx = k \frac{dS}{a}.$$

Therefore, one may assume that changes in specific gravity resulting from changes in temperature produce a dx. A spool stroke (x) is defined a follows:

$$x = cln(Q) \text{ where } c \text{ is a constant and}$$

$$dx = c \frac{dQ}{Q}.$$

Since, $$\frac{dQ}{Q} = \frac{dA}{Q} \text{ when } S = \text{a constant then:}$$

$$k \frac{dS}{a} = c \frac{dQ}{Q} \text{ or}$$

$$k \frac{dS}{a} = c \frac{dA}{A}$$

Therefore, a percentage change in stroke (x) will create a corresponding percentage change in Q or A. Since a constant Q is required, changing A (window area) is desired. Now, if a dx of the proper magnitude is designed between the metering valve 16 and the feedback means 46 then, the metering valve will compensate for fuel density changes that result from changes in temperature with a fixed percentage change in flow independent of the magnitude of the flow. The probe 42 provides such a dx.

The logarithimic window has, by definition, the following x and y coordinates (see FIG. 4):
x=cln Q
x=c(lnQ−ln Q min) or
x=cln(Q/Qmin) which is the window length, and because
$\delta P$=(Qmin ln(Qmax/Qmin))/(b ymin xmax) where b is a constant and $\delta P$ is known. Y is derived from $\delta P$ as follows:
Where Y is the window width.

$$Y = \left( \frac{Q}{Qmin} \right) y \text{ min.}$$

In operation, fuel enters the metering spool 24 where it bathes the probe 12. The rod 44 and shell 42 respond quickly to temperature changes because of the large surface area and thinness of the shell, the access by the rod to the fuel via the shell perforations and the location of the probe within the flow stream. Such response causes the rod to reciprocate within the housing bearing 60 thereby repositioning the feedback means 46. The feedback means sends a signal to the DEC which sends a command to the EHV 40 which regulates flow in line 36 and 38 to null the spool 24. Because the windows 30 are shaped to allow a logarithimic flow, a percentage change in the specific gravity (density) of the fuel causes an area change between the windows 30 and apertures 28 of the metering valve to allow a corresponding percentage change in fuel flow to offset the change in specific gravity. The DEC never needs to know the actual temperature, it only needs to know that there is a temperature change. The temperature probe 12 in combination with the windows, which allow logarithmic flow, provide a simple, fast acting, light and reliable device.

The advantages of the invention art are as follows: The temperature probe is directly in the fuel flow path, and can response very quickly (within 2 or 4 seconds); The temperature probe is very stiff and therefore has no mechanical error associated therewith; and the actual temperature of the fuel does not need to be known.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. Apparatus for metering a constant weight flow of fluid by compensating for temperature changes of said fluid, said apparatus comprising:
   a temperature means for sensing a change in temperature,
   said temperature means changing a given percentage as said temperature of said fluid changes;
   a valve means for metering said flow of fluid, said valve means having;
      a window means having a cross sectional opening for controlling a flow of said fluid therethrough, and a spool means disposed about said temperature means for controlling an area of said opening so that said constant weight flow is maintained as temperature changes, and for cooperating with said temperature means such that as said temperature means changes a given percentage, a corresponding percentage cross-sectional area of flow through said window means is changed by said spool means so that said constant weight flow is maintained; and
   a means for providing a constant pressure drop across said valve means.

2. The apparatus of claim 1 further comprising:
   feedback means for sensing said percentage changing of said temperature means and for controlling said spool such that said spool and said window means cooperate to maintain said weight flow.

3. The apparatus of claim 1, wherein said window means is shaped for allowing a logarithimic flow therethrough such that a percentage movement of said spool means allows a corresponding percentage increase or decrease of an area of said opening allowing flow therethrough.

4. The apparatus of claim 3, wherein the shape of said window means is defined by the x-y coordinates by:

$$x = c \ln(Q/Q\text{min}) \text{ and}$$

$$Y = \left(\frac{Q}{Q\text{min}}\right) Y\text{min}$$

where
   c is a constant,
   Q is weight flow, and
   Ymin is derived from the equation:

$$\delta P = (Q\text{min} \ln (Q\text{max}/Q\text{min}))/(b \text{ ymin ymax})$$

where b is a constant and $\delta P$ is known.

5. The apparatus of claim 3 further comprising:
   feedback means for sensing said percentage changing of said temperature means and for controlling said spool means such that said spool means and said window means cooperate to change said weight flow.

6. The apparatus of claim 11 wherein said temperature means comprises:
   a first element having a first thermal coefficient of expansion; and
   a second element enclosing a portion of said first element and having a second thermal coefficient of expansion.

7. The apparatus of claim 6, further comprising:
   said first element is a rod; and
   said second element is a thin, perforated shell.

8. The apparatus of claim 7, wherein:
   said shell increases in diameter from an upstream to a downstream direction of said weight flow.

* * * * *